(12) United States Patent
Yabusaki et al.

(10) Patent No.: US 12,477,074 B2
(45) Date of Patent: Nov. 18, 2025

(54) IMAGE ANALYSIS METHOD, LEARNING IMAGE OR ANALYSIS IMAGE GENERATION METHOD, LEARNED MODEL GENERATION METHOD, IMAGE ANALYSIS APPARATUS, AND IMAGE ANALYSIS PROGRAM

(71) Applicant: Kowa Company, Ltd., Nagoya (JP)

(72) Inventors: Katsumi Yabusaki, Tokyo (JP); Takao Shinohara, Tokyo (JP)

(73) Assignee: Kowa Company, Ltd., Nagoya (JP)

( * ) Notice: Subject to any disclaimer, the term of this patent is extended or adjusted under 35 U.S.C. 154(b) by 399 days.

(21) Appl. No.: 18/002,429

(22) PCT Filed: Jun. 24, 2021

(86) PCT No.: PCT/JP2021/023916
§ 371 (c)(1),
(2) Date: Dec. 19, 2022

(87) PCT Pub. No.: WO2021/261547
PCT Pub. Date: Dec. 30, 2021

(65) Prior Publication Data
US 2023/0171369 A1 Jun. 1, 2023

(30) Foreign Application Priority Data
Jun. 25, 2020 (JP) ................. 2020-109810

(51) Int. Cl.
*H04N 5/262* (2006.01)
*G06T 7/20* (2017.01)
(Continued)

(52) U.S. Cl.
CPC ............. *H04N 5/2624* (2013.01); *G06T 7/20* (2013.01); *G06T 7/70* (2017.01); *G06T 7/90* (2017.01);
(Continued)

(58) Field of Classification Search
CPC .......... H04N 5/2624; G06T 7/90; G06T 7/70; G06T 7/20; G06T 2207/10016;
(Continued)

(56) References Cited

U.S. PATENT DOCUMENTS 10,139,823 B2    11/2018   Prokhorov et al.
11,549,849 B2 *   1/2023   Johnson ................ G01J 5/0265
(Continued)

FOREIGN PATENT DOCUMENTS

| JP | 2004186994 A | 7/2004 |
| JP | 2016036686 A | 3/2016 |
| JP | 2019003565 A | 1/2019 |

OTHER PUBLICATIONS

The Extended European Search Report for European Patent Application No. 21828345.5 dated Jun. 11, 2024, pp. all.
(Continued)

*Primary Examiner* — Shefali D Goradia
(74) *Attorney, Agent, or Firm* — Dorsey & Whitney LLP

(57) ABSTRACT

An example apparatus comprising an image acquisition unit configured to acquire a plurality of images having temporal or spatial continuity; a channel assignment unit configured to assign a channel different from each other to at least a part of gradation information on a color and/or gradation information on brightness that can be acquired from each image of the plurality of images based on a predetermined rule; a composite image generation unit configured to generate one composite image in which gradation information on at least a part of each image can be identified by the channel by extracting and combining gradation information to which the channel is assigned from each of the plurality of images; and an inference unit configured to analyze the composite image and to infer the plurality of images.

9 Claims, 19 Drawing Sheets

(51) Int. Cl.
*G06T 7/70* (2017.01)
*G06T 7/90* (2017.01)

(52) U.S. Cl.
CPC .............. *G06T 2207/10016* (2013.01); *G06T 2207/10024* (2013.01); *G06T 2207/10072* (2013.01); *G06T 2207/20081* (2013.01); *G06T 2207/20084* (2013.01); *G06T 2207/20212* (2013.01)

(58) Field of Classification Search
CPC . G06T 2207/10024; G06T 2207/10072; G06T 2207/20081; G06T 2207/20084; G06T 2207/20212
See application file for complete search history.

(56) References Cited

U.S. PATENT DOCUMENTS

| | | | |
|---|---|---|---|
| 2015/0063694 A1* | 3/2015 | Shroff | G06T 11/60 382/167 |
| 2018/0074493 A1 | 3/2018 | Prokhorov et al. | |
| 2018/0316910 A1* | 11/2018 | Kashibuchi | G06V 20/20 |
| 2020/0311440 A1* | 10/2020 | Bamba | G06V 10/50 |
| 2022/0230748 A1* | 7/2022 | Sun | G06T 7/11 |

OTHER PUBLICATIONS

Dosovitskiy, Alexey, et al., "FlowNet: Learning Optical Flow with Convolutional Networks", 2015 IEEE International Conference on Computer Vision (ICVV), IEEE,, Dec. 7, 2015, 2758-2766.

Vu, Minh H., et al., "Evaluation of Multi-Slice Inputs to Convolutional Neural Networks for Medical Image Segmentation", ARXIV. Org, Cornell University Library, 201 Olin Library Cornell University Ithaca, NY, 14853, Dec. 19, 2019, 24 pages.

Wen, Haoran, et al., "Deep Learning Based Multistep Solar Forecasting for PV Ramp-Rate Control Using Sky Images", IEEE Transactions on Industrial Informatics, IEEE Service Center, New York, NY, US, vol. 17, No. 2,, Apr. 20, 2020, 1397-1406.

[English Translation] Notification of Reasons for Refusal for Japanese Patent Application No. 2022-532532, dated Nov. 26, 2024, pp. all.

International Search Report and Written Opinion (English Translation for ISR only) for International Patent Application No. PCT/JP2021/023916 mailed Sep. 14, 2021, pp. all.

The First Office Action for Chinese Patent Application No. 202180044139.4 dated Jun. 25, 2025, pp. all.

* cited by examiner

Fig. 7
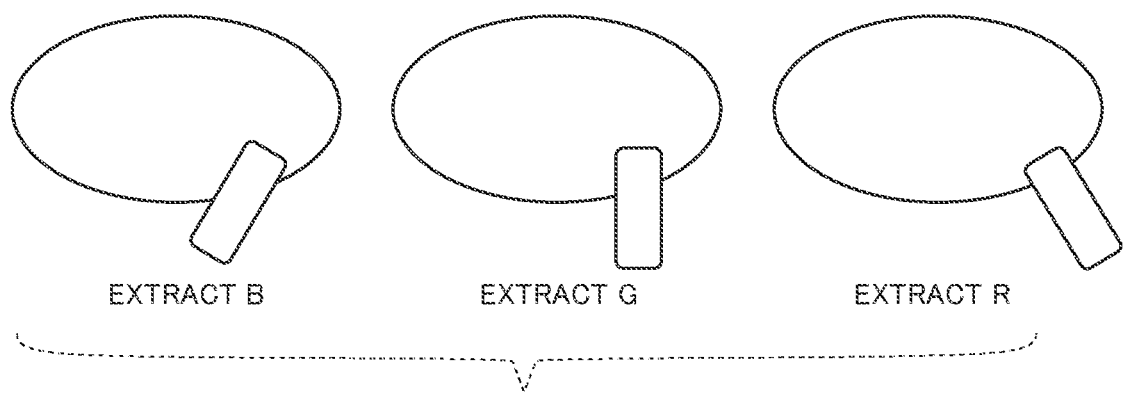
EXTRACT B    EXTRACT G    EXTRACT R
COMPOSITE IMAGE
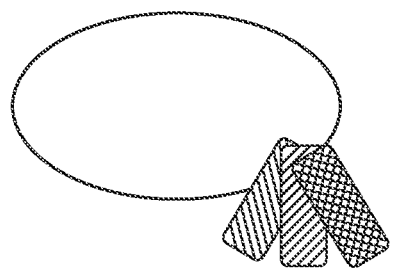
PORTION WITH MOTION IS DISPLAYED
IN ANY ONE OF MONOCHROMES OF RGB

EXAMPLES OF SOCIAL BEHAVIOR OF MICE

|   | NAME | SOCIAL BEHAVIOR |
|---|---|---|
| 1 | Sniffing | SNIFFING PARTNER'S BODY |
| 2 | Following | FOLLOWING PARTNER |
| 3 | Grooming | GROOMING PARTNER'S BODY |
| 4 | Other | NO RELATION |

PHOTOGRAPHED IMAGE

BACKGROUND IMAGE

BINARY IMAGE

Fig. 17

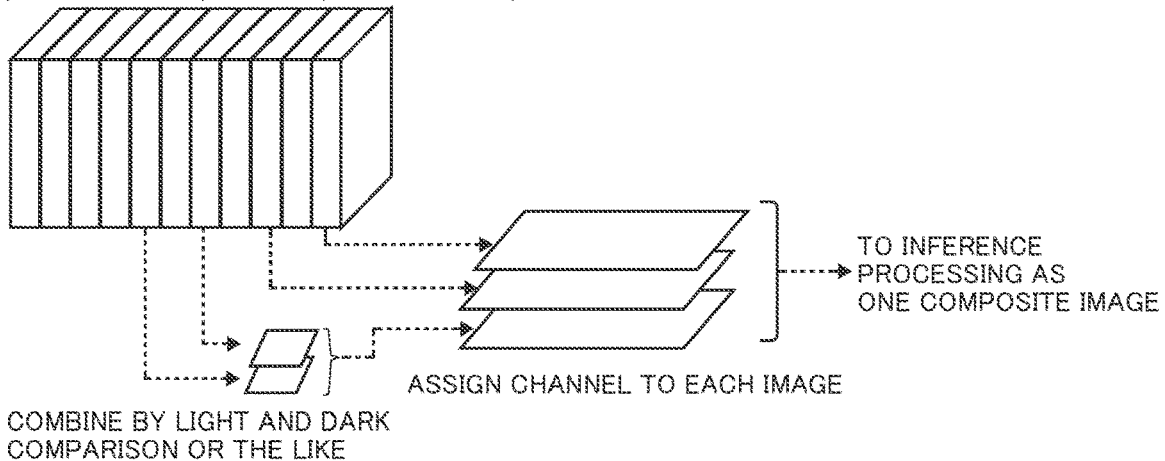

Fig. 18A

RELATIONSHIP BETWEEN SIX COLORS
USED FOR CHANNEL AND THEIR RGB VALUES

| COLOR NAME | R CHANNEL VALUE | G CHANNEL VALUE | B CHANNEL VALUE |
|---|---|---|---|
| RED | 255 | 0 | 0 |
| YELLOW | 255 | 255 | 0 |
| GREEN | 0 | 255 | 0 |
| LIGHT BLUE | 0 | 255 | 255 |
| BLUE | 0 | 0 | 255 |
| PURPLE | 255 | 0 | 255 |

Fig. 18B

UPPER LIMIT SETTING OF RGB VALUES
FOR 6 COLORS TO PREVENT IMAGE FROM COLLAPSE AT TIME OF COMPOSITION

| COLOR NAME | R CHANNEL VALUE | G CHANNEL VALUE | B CHANNEL VALUE |
|---|---|---|---|
| RED | 85 | 0 | 0 |
| YELLOW | 85 | 85 | 0 |
| GREEN | 0 | 85 | 0 |
| LIGHT BLUE | 0 | 85 | 85 |
| BLUE | 0 | 0 | 85 |
| PURPLE | 85 | 0 | 85 |

IMAGE ANALYSIS METHOD, LEARNING IMAGE OR ANALYSIS IMAGE GENERATION METHOD, LEARNED MODEL GENERATION METHOD, IMAGE ANALYSIS APPARATUS, AND IMAGE ANALYSIS PROGRAM

CROSS REFERENCE TO RELATED APPLICATION(S)

This application is a U.S. National Stage filing under 35 U.S.C. § 371 of PCT Application No. PCT/JP2021/023916, filed Jun. 24, 2021, which claims priority to Japanese Application No. 2020-109810, filed Jun. 25, 2020, which are incorporated herein by reference, in their entirety, for any purpose.

TECHNICAL FIELD

The present invention relates to an image analysis method, a learning image or an analysis image generation method, a learned model generation method, an image analysis apparatus, and an image analysis program relating to a plurality of images having temporal or spatial continuity.

BACKGROUND ART

Conventionally, there are needs causing a computer to execute analysis processing for extracting a desired feature from a moving image or three-dimensional data acquired in various situations. In addition, there is an increasing demand for executing analysis processing by what is called artificial intelligence that causes a neural network to learn extraction of a desired feature and executes the extraction using a learned model. However, moving image data and three-dimensional data have a huge data capacity compared to two-dimensional image data, and it is envisaged not to be easy at the present time to directly input these pieces of data into a neural network and to cause the neural network to execute learning processing and actual analysis processing from the viewpoint of convergence of learning, and processing capacity of hardware.

On the other hand, for example, Patent Literature 1 has been proposed as the one executing analysis processing by a composite image combined based on images of a plurality of frames constituting a moving image.

Patent Literature 1 discloses a technique of superimposing a plurality of images obtained by continuously imaging a human body to generate one composite image, and analyzing the composite image by a learned convolutional neural network (CNN) to determine a joint position of the human body.

CITATION LIST

Patent Literature

Patent Literature 1: JP 2019-003565 A

SUMMARY OF INVENTION

Technical Problem

According to the image analysis method described in Patent Literature 1 mentioned above, information for a plurality of frames can be included in one composite image. However, in the technique of Patent Literature 1, since a composite image is generated by simply adding luminance values of a plurality of images, information for grasping a temporal anteroposterior relationship of the motion of the object included in the image is not included in the composite image. Therefore, there is a problem that features of fine movements of positions other than the joint positions cannot be grasped, and the estimation accuracy of the action class based on the composite image is not sufficient.

The present invention has been made in view of the above problems, and an object of the present invention is to provide an image analysis method, a learning image or analysis image generation method, a learned model generation method, an image analysis apparatus, and an image analysis program capable of accurately and quickly estimating a motion or an attribute of an object based on a plurality of images having temporal or spatial continuity.

Solution to Problem

An image analysis method according to the present invention includes: an image acquisition step of acquiring a plurality of images having temporal or spatial continuity; a channel assignment step of assigning a channel different from each other to at least a part of gradation information on a color and/or gradation information on brightness that can be acquired from each image of the plurality of images based on a predetermined rule; a composite image generation step of generating one composite image in which gradation information on at least a part of each image can be identified by the channel by extracting and combining gradation information to which the channel is assigned from each of the plurality of images; and an inference step of analyzing the composite image and inferring the plurality of images.

In addition, in the image analysis method according to the present invention, the channel assignment step further includes: assigning a color having a hue different from each other as a channel to each of the plurality of images, and setting gradation information corresponding to an assigned color as gradation information to which a channel is assigned. The composite image generation step further includes extracting gradation information to which the channel is assigned from each of the plurality of images and combining the extracted gradation information, to generate one color composite image in which pieces of gradation information corresponding to colors having different hues are combined.

In addition, in the image analysis method according to the present invention, the inference step further includes: inputting the composite image generated in the composite image generation step to a learned model on which machine learning is performed in advance based on a plurality of composite images generated from a plurality of sample images used for learning, and obtaining an output of the learned model as an inference result.

In addition, in the image analysis method according to the present invention, the plurality of images are further a plurality of images extracted at regular time intervals from a moving image including a plurality of images having temporal continuity obtained by shooting a moving image of a predetermined moving object. The inference step further includes executing inference related to a motion pattern of the predetermined object from the composite image generated based on the moving image.

In addition, in the image analysis method according to the present invention, the image analysis method further includes a positional information acquisition step of acquiring positional information on the object at a time of acquiring a plurality of images in the image acquisition step. When a plurality of objects is to be analyzed, the image acquisition step further includes acquiring the plurality of images for each of the plurality of objects. The positional information acquisition step further includes acquiring the positional information on each of the plurality of objects. The channel assignment step further includes assigning a channel to each of a plurality of acquired images for each object. The composite image generation step further includes generating the composite image for each of the objects. The inference step further includes executing inference related to motion patterns of the plurality of objects with a plurality of the composite images generated for each of the objects and the positional information on each of a plurality of objects as inputs.

In addition, in the image analysis method according to the present invention, the plurality of images are further a plurality of tomographic images having continuity in a specific direction when a three-dimensional region is represented by stacking a plurality of acquired tomographic images in the specific direction, or a plurality of tomographic images extracted from a three-dimensional model so as to have continuity in a specific direction when a three-dimensional region is represented by a three-dimensional model from which a tomographic image can be optionally extracted. The inference step further includes executing inference related to the three-dimensional region from the composite image.

A learning image or an analysis image generation method according to the present invention includes: an image acquisition step of acquiring a plurality of images having temporal or spatial continuity; a channel assignment step of assigning a channel different from each other to at least a part of gradation information on a color and/or gradation information on brightness that can be acquired from each image of the plurality of images based on a predetermined rule; and a composite image generation step of generating one composite image in which gradation information on at least a part of each image can be identified by the channel by extracting and combining gradation information to which the channel is assigned from each of the plurality of images.

A learned model generation method according to the present invention includes: an image acquisition step of acquiring a plurality of images having temporal or spatial continuity; a channel assignment step of assigning a channel different from each other to at least a part of gradation information on a color and/or gradation information on brightness that can be acquired from each image of the plurality of images based on a predetermined rule; a composite image generation step of generating one composite image in which gradation information on at least a part of each image can be identified by the channel by extracting and combining gradation information to which the channel is assigned from each of the plurality of images; a correct answer data acquisition step of acquiring correct answer data when inference on the composite image is executed; an inference step of inputting the composite image to a model including a neural network, causing inference to be executed, and causing an inference result to be output; and a parameter update step of updating a parameter of the model using the inference result and correct answer data.

An image analysis apparatus according to the present invention includes: an image acquisition unit configured to acquire a plurality of images having temporal or spatial continuity; a channel assignment unit configured to assign a channel different from each other to at least a part of gradation information on a color and/or gradation information on brightness that can be acquired from each image of the plurality of images based on a predetermined rule; a composite image generation unit configured to generate one composite image in which gradation information on at least a part of each image can be identified by the channel by extracting and combining gradation information to which the channel is assigned from each of the plurality of images; and an inference unit configured to analyze the composite image and to infer the plurality of images.

An image analysis program according to the present invention is for causing a computer to implement: an image acquisition function of acquiring a plurality of images having temporal or spatial continuity; a channel assignment function of assigning a channel different from each other to at least a part of gradation information on a color and/or gradation information on brightness that can be acquired from each image of the plurality of images based on a predetermined rule; a composite image generation function of generating one composite image in which gradation information on at least a part of each image can be identified by the channel by extracting and combining gradation information to which the channel is assigned from each of the plurality of images; and an inference function of analyzing the composite image and inferring the plurality of images.

Advantageous Effects of Invention

One or more deficiencies are solved by the embodiments of the present application.

BRIEF DESCRIPTION OF DRAWINGS

FIG. 7 is an explanatory diagram more schematically representing a state of composite image generation shown in FIG. 6.

FIG. 17 is an explanatory diagram representing another method of composite image generation in the image analysis apparatus corresponding to at least one of the embodiments of the present invention.

FIGS. 18A and B are explanatory diagrams representing a relationship between each color and an RGB value when a 6-color system is adopted as a channel related to gradation information.

DESCRIPTION OF EMBODIMENTS

Hereinafter, an example of an embodiment of the present invention will be described with reference to the drawings. It should be noted that various components in the examples of the respective embodiments described below can be appropriately combined in a scope no contradiction or the like occurs. In addition, description of content described as an example of an embodiment may be omitted in other embodiments. In addition, the content of operation and processing not related to the feature portions of each embodiment may be omitted. Furthermore, the order of various types of processing constituting the various flows described below is in random order in a scope no contradiction or the like occurs in the processing content.

First Embodiment

Figure 1:
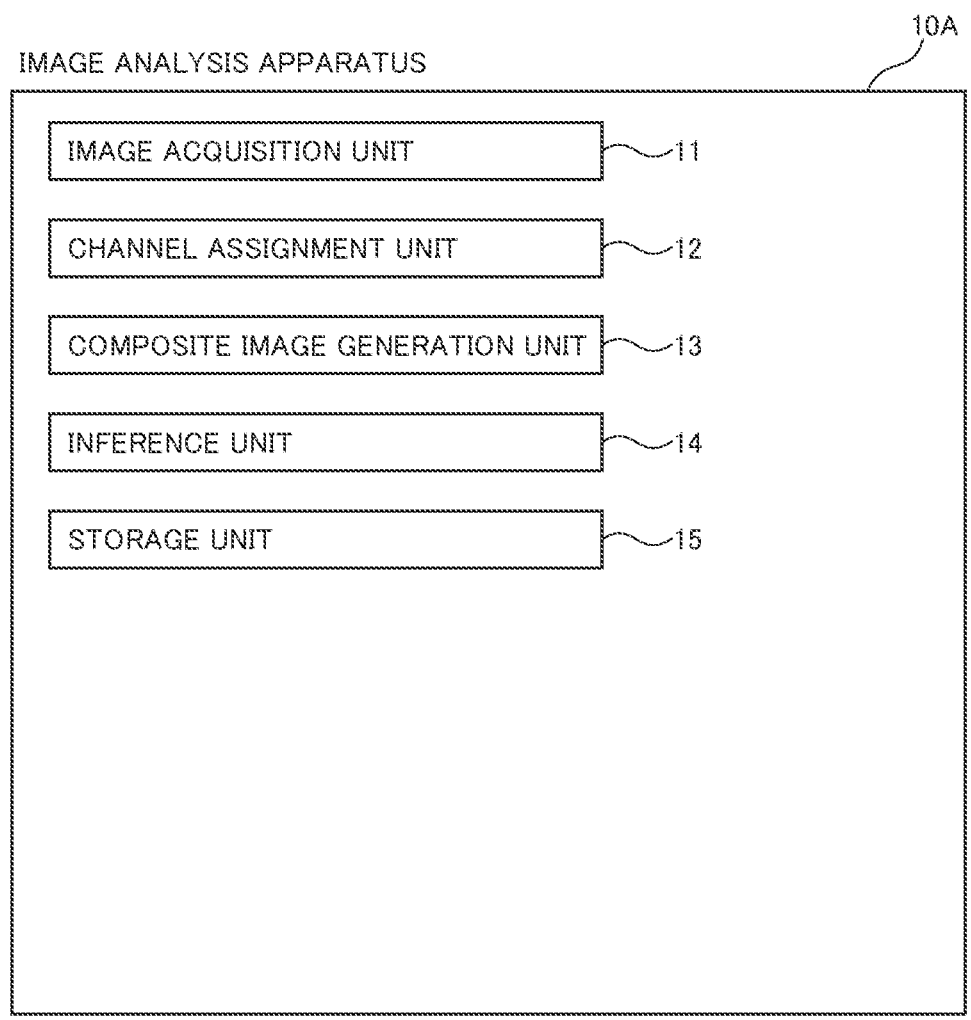
FIG. 1 is a block diagram showing an example of a configuration of an image analysis apparatus corresponding to at least one of embodiments of the present invention.

Hereinafter, an example of an image analysis apparatus according to a first embodiment of the present invention will be described with reference to the drawings. FIG. 1 is a block diagram showing an example of a configuration of an image analysis apparatus corresponding to at least one of embodiments of the present invention. As shown in FIG. 1, an image analysis apparatus 10A being an example of the image analysis apparatus 10 includes an image acquisition unit 11, a channel assignment unit 12, a composite image generation unit 13, an inference unit 14, and a storage unit 15. It should be noted that the image analysis apparatus 10 may be an apparatus designed as a dedicated machine, but shall be one implementable by a general computer. That is, the image analysis apparatus 10 includes at least a central processing unit (CPU) and a memory that would be usually included in a general computer. In addition, a graphics processing unit (GPU) may be included. In addition, a configuration in which an input device such as a mouse or a keyboard, an output device such as a printer, and a communication device for connecting to a communication network are connected through a bus may be used. Processing in each unit of the image analysis apparatus 10 is implemented by reading a program for executing processing in each unit from a memory and executing the program in a CPU or a GPU that functions as a control circuit (processing circuit, processing circuitry). In other words, a processor (processing circuit) is configured to be able to execute each piece of processing of each apparatus by executing the program.

Figure 2:
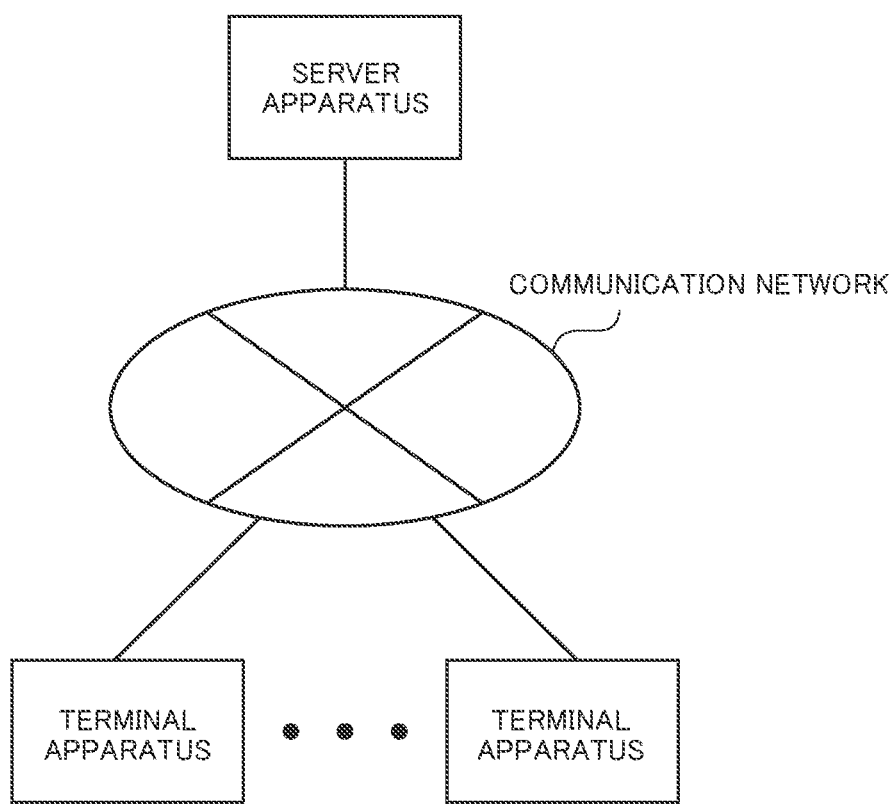
FIG. 2 is a block diagram showing an example of an environment to which an image analysis apparatus corresponding to at least one of the embodiments of the present invention is applied.

FIG. 2 is a block diagram showing an example of an environment to which an image analysis apparatus corresponding to at least one of the embodiments of the present invention is applied. In FIG. 2, a server apparatus and a plurality of terminal apparatuses are configured to be mutually connectable through a communication network. For example, the server apparatus in FIG. 2 may be caused to function as the image analysis apparatus 10, and may be used by being connected to the server apparatus functioning as the image analysis apparatus 10 from any one of a plurality of terminal apparatuses through a communication network. At that time, a program for using the image analysis apparatus may be configured to be installed in the terminal apparatus, or a program on a server may be configured to be used through a browser. In addition, for example, the terminal apparatus in FIG. 2 is caused to function as the image analysis apparatus 10, but a server apparatus may be caused to have a partial function of the image analysis apparatus 10 in that case, and the partial function may be configured to be used by accessing the server apparatus from the terminal apparatus through a communication network.

In addition, it is not necessary for the same apparatus to include all the components of the image analysis apparatus 10 described below, and by causing another apparatus to include a partial configuration, for example, by causing each of some of a server apparatus and a plurality of terminal apparatuses connectable through a communication network to include a partial configuration, a configuration included in another apparatus may be used while the image analysis apparatus 10 performs communication. In addition, the number of server apparatuses is not limited to one, and a plurality of server apparatuses may be used. In addition, in addition to the case of being stored in the apparatus itself functioning as the image analysis apparatus 10, the learned model described below may be caused to be distributed and included in a server apparatus as another apparatus, a plurality of terminal apparatuses, and the like, and may be used by being connected to an apparatus including the learned model to be used through a communication network each time. That is, as long as a learned model stored by some storage means can be used, it does not matter whether the learned model storage means is included in the image analysis apparatus itself or another apparatus.

The image acquisition unit 11 has a function of acquiring a plurality of images having temporal or spatial continuity. Here, the plurality of images having temporal continuity refers to a plurality of temporally continuously acquired images, and for example, a plurality of images acquired based on a predetermined rule from a moving image or the like. In addition, when information about a three-dimensional space on a predetermined plane in the case where the three-dimensional space in a predetermined range intersects the predetermined plane is referred to as a tomographic image, a plurality of images having spatial continuity refers to a plurality of images obtained by acquiring a tomographic image in each of the plurality of predetermined planes so that the plurality of predetermined planes are continuous in parallel in one direction, and for example, a plurality of images acquired based on a predetermined rule from voxel data representing a predetermined three-dimensional region obtained by an optical coherence tomography apparatus (OCT) or the like. It should be noted that the plurality of images having spatial continuity may be a plurality of tomographic images having continuity in a specific direction in a case where a three-dimensional region is represented by stacking a plurality of acquired tomographic images in a specific direction, or may be a plurality of tomographic images extracted from a three-dimensional model so as to have continuity in a specific direction in a case where the three-dimensional region is represented by a three-dimensional model from which a tomographic image can be optionally extracted.

In addition, the plurality of images only needs to have temporal or spatial continuity, and are not requested so far as to have been continuously acquired at the time of acquisition. For example, it is not required to always select consecutive frames in a case where a moving image of 60 fps is captured, and for example, it can be said to have temporal continuity also when one frame is acquired every 15 frames and images of four frames are acquired per second.

The channel assignment unit 12 has a function of assigning channels different from each other to at least some of gradation information on color and/or gradation information on brightness that can be acquired from each of a plurality of images based on a predetermined rule. Here, the channel refers to identification information assigned to identify color gradation information and/or brightness gradation information (luminance information) that can be acquired from each image when a plurality of images is combined, from those of another image. Any channel may be set as long as the gradation information on each image can be identified. For example, colors having hues different from each other as channels are assigned to each of a plurality of images, and gradation information corresponding to the assigned color may be used as gradation information for identifying the image. As a specific example, it is conceivable to acquire three images and assign three colors of RGB to the three respective images as channels. In each image, only any one color of RGB is treated as gradation information to which a channel is assigned.

By extracting gradation information to which a channel is assigned from each of a plurality of images and combining them, the composite image generation unit 13 has a function of generating one composite image in which gradation information on at least a part of each image can be identified by the channel. The method of image composition here may be different depending on the type of channel or the like. For example, when three images are acquired and three colors of RGB are assigned as channels to the three respective images, gradation information on only any one color of RGB is extracted in each image, and a color composite image is generated based on the gradation information on RGB acquired from the three images, similarly to a case where a color image is generated from the gradation information on RGB in the same image.

The inference unit 14 has a function of analyzing the composite image and inferring a plurality of images. The content of the inference here varies depending on the object to be handled, and various types of inference can be adopted. The inference unit 14 executes inference regarding image analysis to obtain an inference result. In addition, the inference processing in the inference unit 14 may be executed based on a learned model obtained by performing learning in advance. The learning processing of the learned model may be executed using, for example, a composite image for learning and correct answer data on inference of the composite image as a set. As the learned model, various models can be applied as long as learning is performed by machine learning, and for example, causing to learn a neural network by deep learning corresponds. Furthermore, as an example, it is also possible to adopt an existing learned convolutional neural network (CNN) such as ResNet or VGG and to adopt one that has performed additional learning (transfer learning) as necessary. According to a method of preparing a large number of learning composite images related to an inference target and learning the learned model from scratch, there is an advantage that a learned model capable of performing high-accuracy inference well fitted to the tendency of the learning composite image can be obtained. On the other hand, the method of adopting the existing learned model has an advantage that inference processing of a classification problem or the like can be immediately executed even without time for learning from scratch.

The storage unit 15 has a function of storing information necessary for processing of each unit in the image analysis apparatus 10A and storing various types of information generated by the processing of each unit. In addition, the learned model may be stored in the storage unit 15. It should be noted that a configuration may be used in which the learned model is stored in a server apparatus connectable through a communication network, and the server apparatus is caused to have the function of the inference unit 14.

Figure 3:
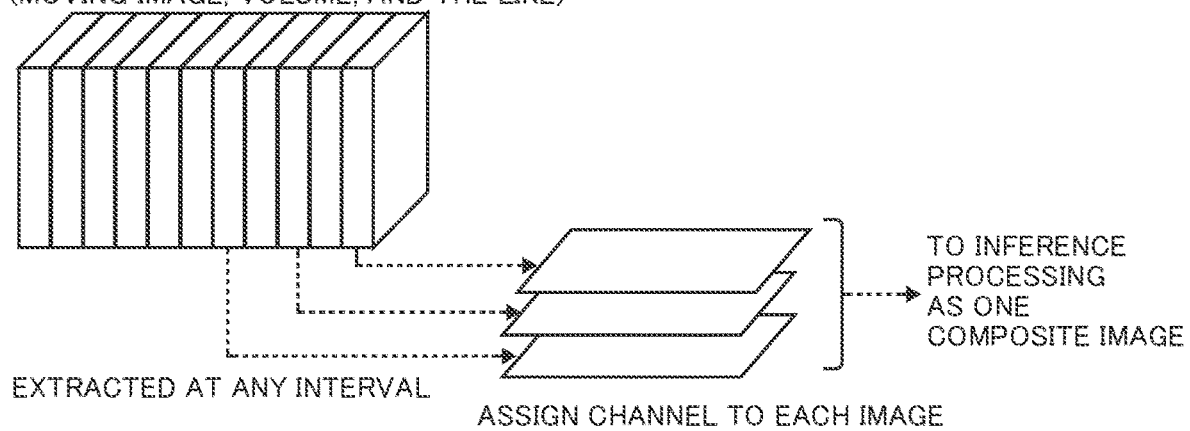
FIG. 3 is an explanatory diagram representing a concept of composite image generation in the image analysis apparatus corresponding to at least one of the embodiments of the present invention.

FIG. 3 is an explanatory diagram representing a concept of composite image generation in the image analysis apparatus corresponding to at least one of the embodiments of the present invention. As shown in FIG. 3, in the present embodiment, a plurality of images, for example, three images are extracted at predetermined intervals from temporally or spatially continuous data such as a moving image and voxel data, a channel is assigned to each image and then a composite image is generated, and inference as image analysis is executed using the composite image.

Figure 4:
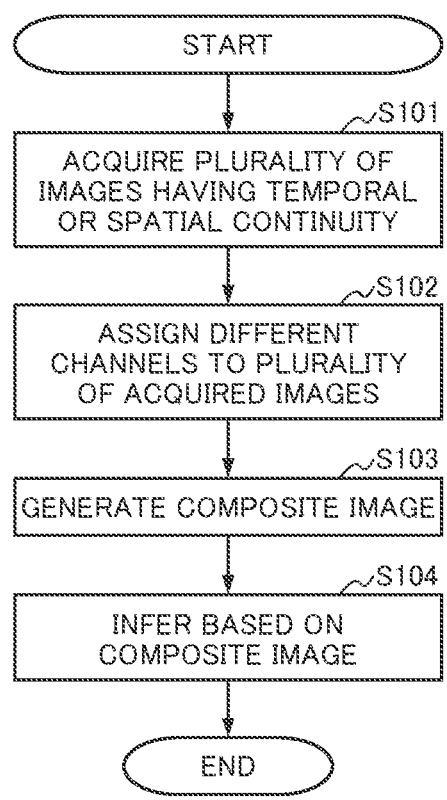
FIG. 4 is a flowchart showing an example of a flow of image analysis processing corresponding to at least one of the embodiments of the present invention.

Next, a flow of image analysis processing corresponding to at least one of the embodiments of the present invention will be described. FIG. 4 is a flowchart showing an example of a flow of image analysis processing corresponding to at least one of the embodiments of the present invention. In FIG. 4, the image analysis processing is started by acquiring a plurality of images having temporal or spatial continuity in the image analysis apparatus 10A (step S101). Next, the image analysis apparatus 10A assigns different channels to the plurality of acquired images (step S102). Next, the image analysis apparatus 10A extracts gradation information to which a channel is assigned in each of the plurality of images, combines the pieces of gradation information into one to generate a composite image (step S103). Then, the image analysis apparatus 10A executes inference based on the composite image, acquires an inference result related to image analysis (step S104), and ends the image analysis processing.

Figure 5:
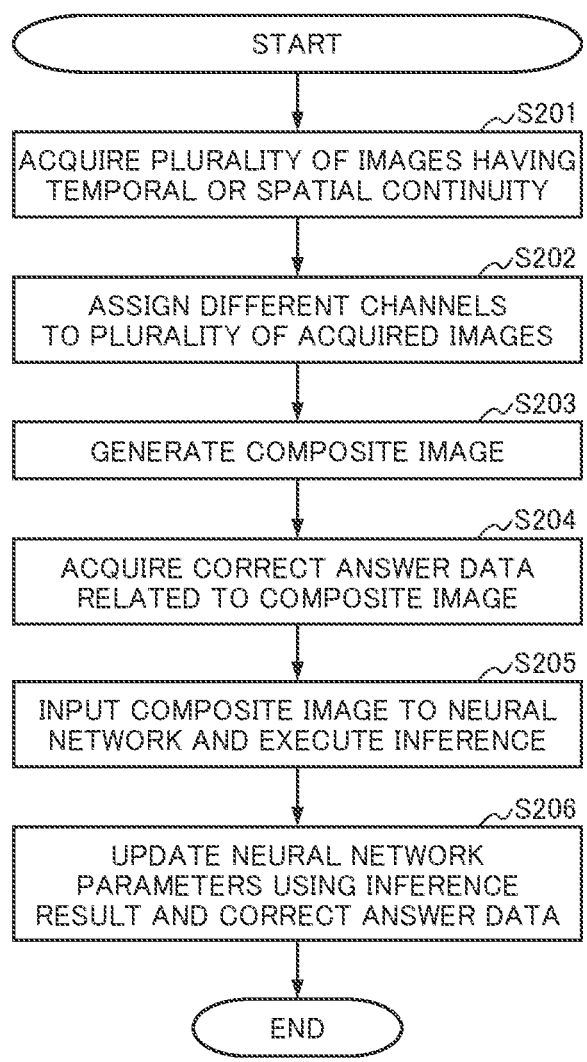
FIG. 5 is a flowchart showing an example of a flow of learning processing corresponding to at least one of the embodiments of the present invention.

The inference in the image analysis processing described above may be any processing, but when inference is performed using a learned model, learning may be required in advance. Thus, the flow of the learning processing corresponding to at least one of the embodiments of the present invention will be described with a case where the learning target is a model including a neural network as an example. FIG. 5 is a flowchart showing an example of a flow of learning processing corresponding to at least one of the embodiments of the present invention. In FIG. 5, the learning processing is started by acquiring a plurality of images having temporal or spatial continuity as data used for learning in the image analysis apparatus 10A (step S201). Next, the image analysis apparatus 10A assigns different channels to the plurality of acquired images (step S202). Next, the image analysis apparatus 10A extracts gradation information to which a channel is assigned in each of the plurality of images, combines the pieces of gradation information into one to generate a composite image (step S203). In addition, the image analysis apparatus 10A acquires correct answer data related to the generated composite image (step S204). The correct answer data is data indicating a correct answer related to inference, and is usually annotated by a human hand. Then, the image analysis apparatus 10A inputs the composite image into the neural network to be learned to execute inference, and acquires an inference result related to image analysis (step S205). Then, the parameters of the neural network are updated using the obtained inference result and the correct answer data, and the learning processing is terminated. In the flowchart shown in FIG. 5, the description has been given as the learning processing until the parameters of the neural network are updated once based on one composite image, but actually, it is necessary to sequentially update the parameters based on a large number of composite images so as to improve the inference accuracy. For updating the parameters, for example, a method of executing calculation of a loss of an inference result based on a loss function and updating the parameters in a direction in which the loss decreases is conceivable.

Here, a specific example of image analysis performed by applying the image analysis apparatus 10A according to the first embodiment of the present invention will be described. The image analysis apparatus 10A according to the first embodiment of the present invention is targeted at those applied to a plurality of images having temporal continuity, that is, at those captured as a moving image, and it can be said that a situation in which an object to be captured operates according to the lapse of time is an application target. Specifically, the image analysis apparatus 10A can be applied to analyze a moving image obtained by shooting a moving animal such as a mouse as an object.

As an experiment related to mouse motion, there is a forced swimming test. For example, in order to examine the efficacy of a drug for depression or a drug for schizophrenia, a drug is administered to a mouse, and this is performed as a research experiment on the influence of the drug. Whether or not a change such as decline in motivation of a mouse occurs due to the influence of a drug is identified from the time during which an active action is performed in the forced swimming test (mobility time) and the immobility time. For example, the length of immobility time or the like is used as an index of drug efficacy. The difficulty in the motion analysis of the forced swimming test is that, for example, an action in which the mouse does flutter kicks only with the hind limb (one leg) by a wall of the case needs to be identified as an immobility time in which the mouse itself moves but does not have motivation, and the determination of identifying the action as the immobility time despite the mouse being in such motion becomes a determination error in computer analysis based on the presence or absence of a simple motion. Thus, the image analysis apparatus 10A is applied for highly accurate analysis related to the motion of the mouse in the forced swimming test.

Figure 6:
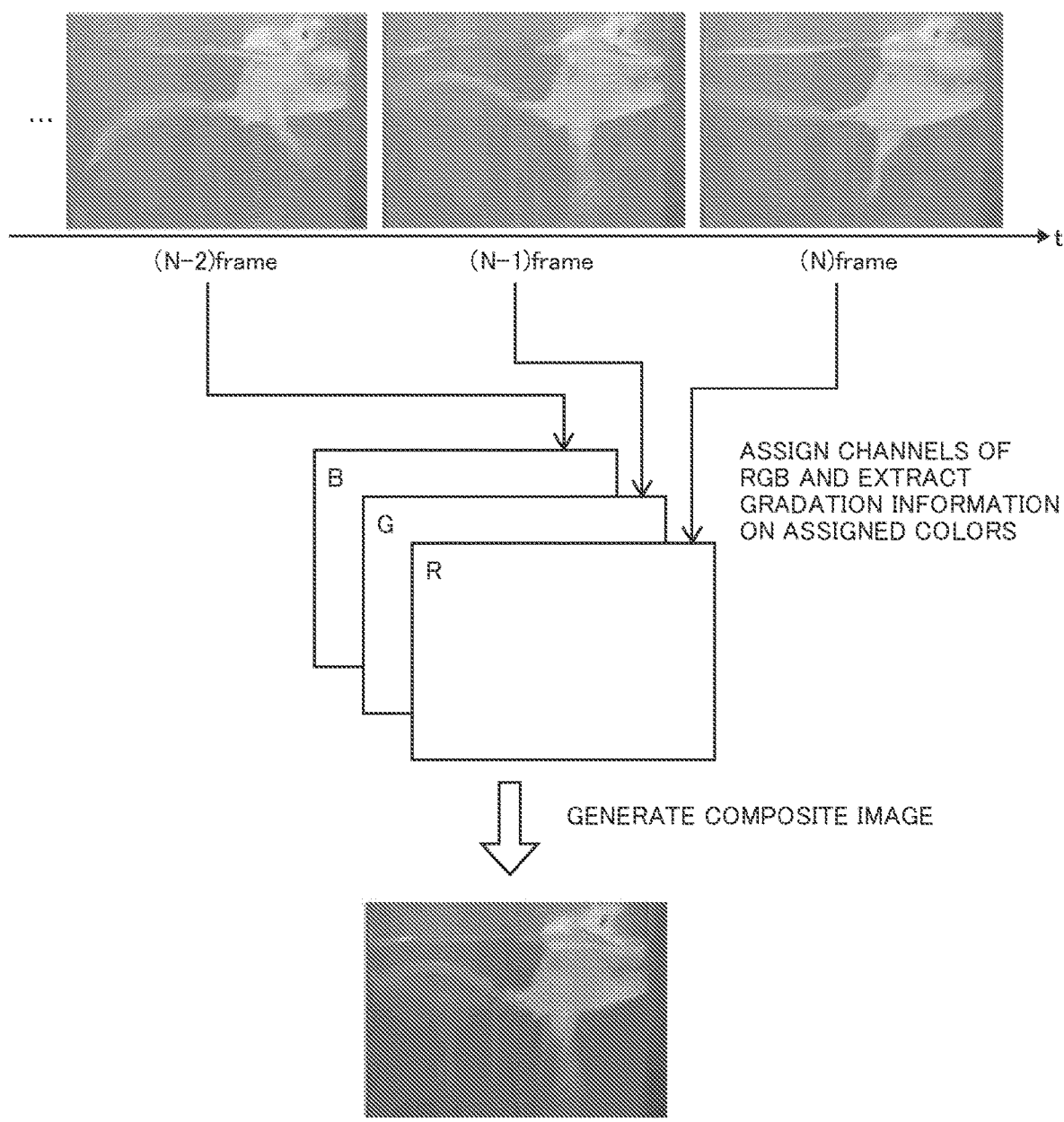
FIG. 6 is an explanatory diagram representing a state of composite image generation when the image analysis apparatus 10A is applied for motion analysis of a mouse in the forced swimming test.

FIG. 6 is an explanatory diagram representing a state of composite image generation when the image analysis apparatus 10A is applied for motion analysis of a mouse in the forced swimming test. Images of three frames are extracted at predetermined intervals from a moving image obtained by shooting a mouse during the forced swimming test, and RGB channels are assigned to the extracted three frames. Only the gradation information on the assigned color is extracted from each image. Each of the three images is an image of only the gradation information on R, an image of only the gradation information on G, and an image of only the gradation information on B, and a composite image is obtained by combining these images. Inference is executed using the composite image generated in this manner.

FIG. 7 is an explanatory diagram more schematically representing a state of composite image generation shown in FIG. 6. In the three images in FIG. 7, the elliptical portion corresponding to the body of the mouse does not move, and only the rectangular portion corresponding to the leg of the mouse moves and changes. When RGB channels are assigned to the three images, gradation information on the assigned colors is extracted, and a composite image is generated, the elliptical portions without movement have gradation information on RGB combined all together, and thus, are displayed in the same manner as in the original image. However, the rectangular portions with movement have only the gradation information on each displayed, and thus, are each displayed in a single color of RGB (displayed in at least a color different from the original color). As described above, when there is a portion moving between the three selected images, it is possible to recognize the moving portion even when the composite image is visually confirmed.

As described above, by using the learned model obtained by, for example, performing learning of the neural network using the composite image and the correct answer data, at that time, on various motions of the mouse in the forced swimming test of the mouse, for example, it is possible to appropriately determine an action of doing flutter kicks only with the hind limb (one leg) by a wall as the immobility time.

As described above, as one aspect of the first embodiment, an image acquisition unit configured to acquire a plurality of images having temporal or spatial continuity; a channel assignment unit configured to assign a channel different from each other to at least a part of gradation information on a color and/or gradation information on brightness that can be acquired from each image of the plurality of images based on a predetermined rule; a composite image generation unit configured to generate one composite image in which gradation information on at least a part of each image can be identified by the channel by extracting and combining gradation information to which the channel is assigned from each of the plurality of images; and an inference unit configured to analyze the composite image and to infer the plurality of images are included. Therefore, it is possible to accurately estimate the motion or attribute of the object based on a plurality of images having temporal or spatial continuity.

That is, since the composite image used for inference is a two-dimensional image unlike a moving image or three-dimensional data being a plurality of images having temporal or spatial continuity, convergence of learning when the composite image is input to a neural network and learning processing or actual analysis processing is executed can be expected, and it can be said that regarding the hardware processing capacity, sufficient processing can be performed by a current commercially available computer. Since this composite image is a two-dimensional image but includes information on a plurality of images, it is possible to perform highly accurate inference using information on movement of an object and correlation of a space that are not known from a single image.

Second Embodiment

Hereinafter, an example of an image analysis apparatus according to a second embodiment of the present invention will be described with reference to the drawings. In the second embodiment, a case will be described in which a plurality of objects is assumed to be analyzed, and the image analysis apparatus of the present invention is applied to a situation in which the positional relationship between the plurality of objects also affects the analysis result. Specifically, a case where the image analysis apparatus of the present invention is applied to analysis of social behavior by a plurality of mice will be described as an example.

Figure 8:
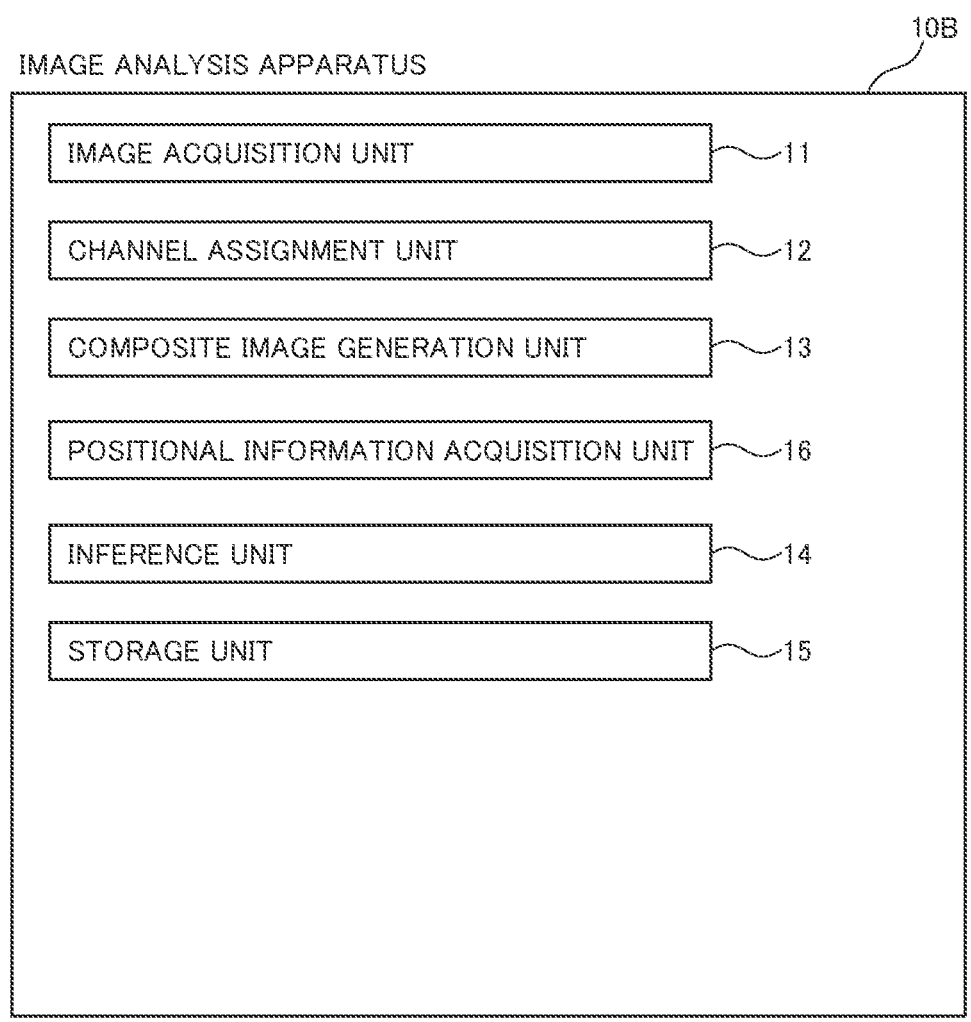
FIG. 8 is a block diagram showing an example of a configuration of an image analysis apparatus corresponding to at least one of embodiments of the present invention.

FIG. 8 is a block diagram showing an example of a configuration of an image analysis apparatus corresponding to at least one of embodiments of the present invention. As shown in FIG. 8, an image analysis apparatus 10B being an example of the image analysis apparatus 10 includes: an image acquisition unit 11, a channel assignment unit 12, a composite image generation unit 13, a positional information acquisition unit 16, an inference unit 14, and a storage unit 15. Configurations denoted by the same reference numerals as those in the first embodiment have functions similar to those described in the first embodiment, and detailed description of the same functions will be omitted. The second embodiment is different from the first embodiment in that a situation in which a plurality of objects is simultaneously photographed is assumed, and in that case, image acquisition and composite image generation are executed for each object.

The image acquisition unit 11 acquires a plurality of images having temporal or spatial continuity, and further has a function of identifying a portion in which a plurality of objects included in each acquired image appear, and acquiring respective images in a predetermined range in which each object appears from each image.

The channel assignment unit 12 has a function of assigning a channel to each of the plurality of acquired images for each object. A plurality of images in a predetermined range in which the object appears is acquired for each object, and a channel is assigned to the plurality of images for each object.

The composite image generation unit 13 has a function of generating a composite image for each object. When two objects appear in the moving image, two composite images are generated.

The positional information acquisition unit 16 has a function of acquiring positional information on an object at the time of acquiring a plurality of images. A plurality of images is acquired from a moving image obtained by shooting a plurality of objects, and positional information on each of the plurality of objects in each image is acquired. It is conceivable that the positional information is, for example, coordinate data. In the case of acquiring a plurality of images, positional information on an object in all images may be acquired, positional information in a first image and a last image may be acquired, or positional information on an object in at least one image is acquired.

The inference unit 14 has a function of executing inference related to the motion patterns of the plurality of objects with the plurality of composite images generated for each object and the positional information on each of the plurality of objects as inputs. Various methods can be adopted for inference, and as an example, when a method of performing inference using a learned model in which learning has been performed on a neural network in advance is adopted, it is preferable to configure a neural network for executing multi-modal learning in order to implement a model using mutually different elements as inputs, such as a composite image for a plurality of objects and positional information on each of the plurality of objects as in the present example.

Figure 9:
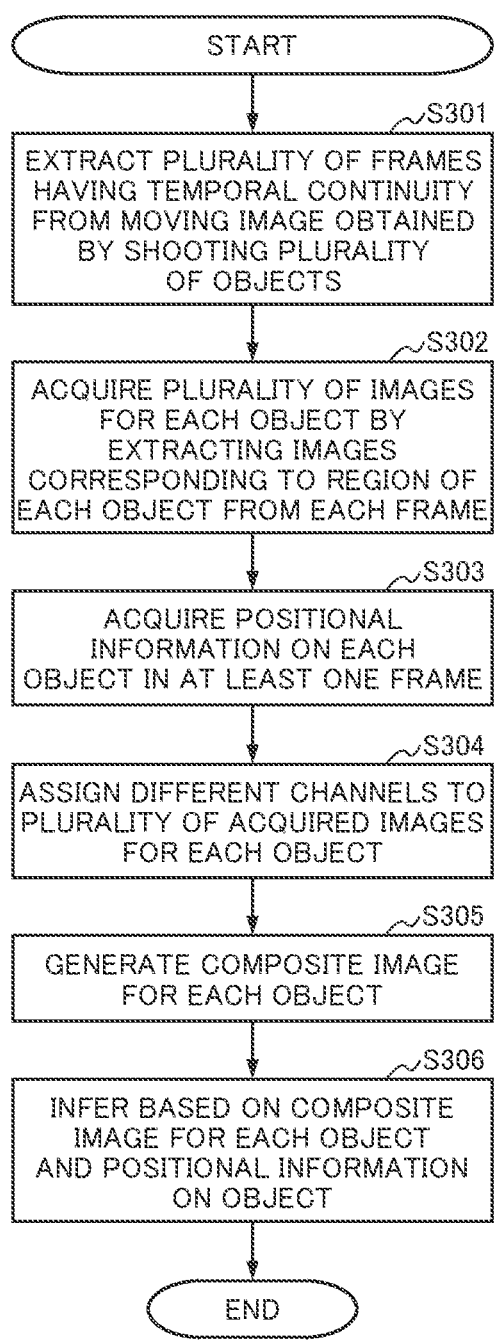
FIG. 9 is a flowchart showing an example of a flow of image analysis processing corresponding to at least one of the embodiments of the present invention.

Next, a flow of image analysis processing corresponding to at least one of the embodiments of the present invention will be described. FIG. 9 is a flowchart showing an example of a flow of image analysis processing corresponding to at least one of the embodiments of the present invention. In FIG. 9, the image analysis processing is started in the image analysis apparatus 10B by extracting a plurality of frames having temporal continuity from a moving image obtained by shooting a plurality of objects (step S301). Next, the image analysis apparatus 10B acquires a plurality of images for each object by extracting an image corresponding to the region of each object from each frame (step S302). Next, positional information on each object in at least any one frame is acquired (step S303). Next, the image analysis apparatus 10B assigns different channels to the plurality of acquired images for each object (step S304). Next, the image analysis apparatus 10B extracts gradation information to which a channel is assigned in each of the plurality of images, combines the pieces of gradation information into one to generate a composite image for each object (step S305). Then, the image analysis apparatus 10B executes inference based on the composite image generated for each object and the positional information on each object, acquires an inference result related to image analysis (step S306), and ends the image analysis processing.

Here, a specific example of image analysis performed by applying the image analysis apparatus 10B according to the second embodiment of the present invention will be described. The image analysis apparatus 10B according to the second embodiment of the present invention is applied to a plurality of images having temporal continuity, that is, a situation in which a plurality of objects is included as an object to be captured as a moving image.

Specifically, the image analysis apparatus 10B can be applied to analyzing social behavior of a mouse when a plurality of mice is put together in the same cage and behavior is observed.

As an experiment for examining the social nature of mice, there is a social interaction test. It is a test in which two mice are released into the same cage and how much social behavior (sociability) is performed during a predetermined time. For example, there is a case where a drug is administered to a mouse in order to examine the efficacy of a drug for depression or a drug for schizophrenia, and a social interaction test is performed as a research experiment on drug influence. Mice exhibiting a disease condition similar to depression or schizophrenia tend to have reduced social behavior, and social behavior may be analyzed by a social interaction test to determine drug efficacy.

Figure 10:
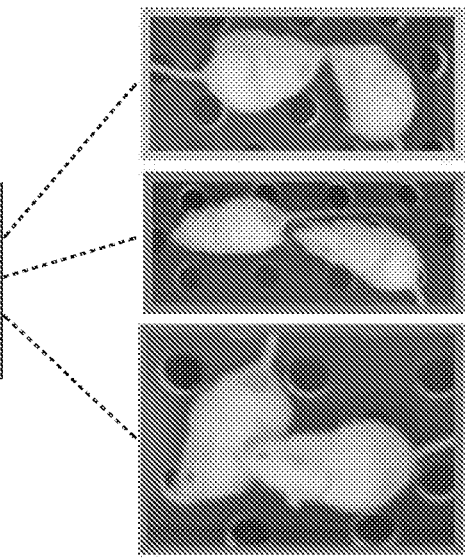
FIG. 10 is an explanatory diagram representing an example of social behavior of a mouse to be analyzed in the social interaction test.

FIG. 10 is an explanatory diagram representing an example of social behavior of a mouse to be analyzed in the social interaction test. As shown in FIG. 10, the social behavior of the mouse includes "Sniffing" of sniffing the body of the partner, "Following" of following the partner, "Grooming" of grooming the body of the partner, and the like, and is identified from the transition of the behavior of one mouse with respect to the other mouse. Even if the positional relationship between the two animals on the two-dimensional image, the orientation of the bodies, and the like are close to "Sniffing", the positional relationship happens to be established and there may be a case where an action of sniffing the partner's body is not actually performed. Therefore, it is difficult to determine social behavior with high accuracy only with a still image. Thus, the image analysis apparatus 10B is applied to a moving image obtained by shooting a state of the social interaction test.

Figure 11A:
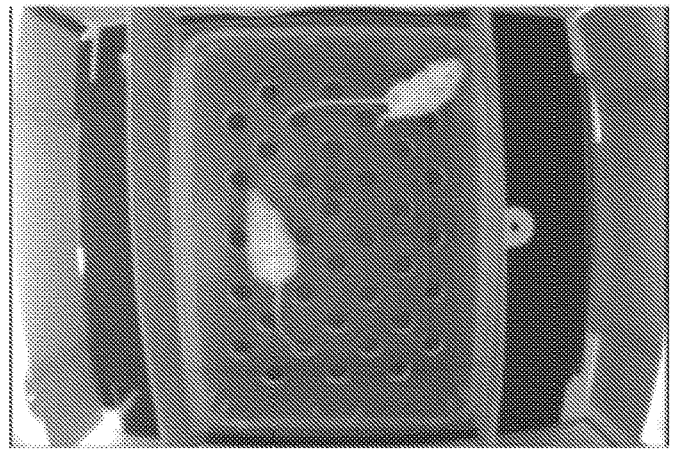
FIGS. 11A-C are explanatory diagrams representing an example of a method of extracting a position of a mouse to be analyzed in the social interaction test.
Figure 11B:
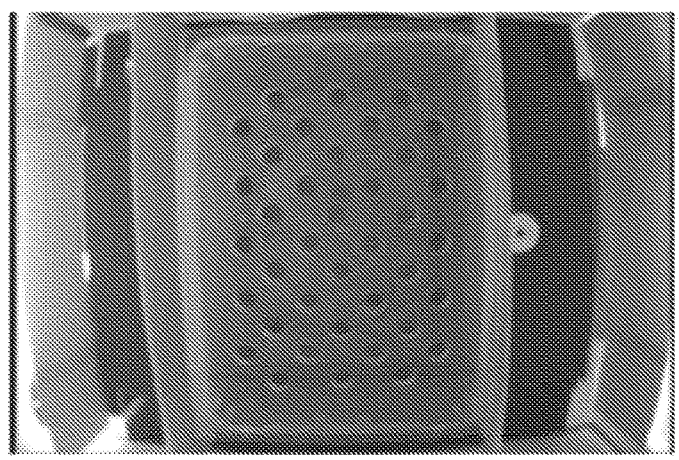
Figure 11C:

FIGS. 11A-C are explanatory diagrams representing an example of a method of extracting a position of a mouse to be analyzed in the social interaction test. FIG. 11C shows a binary image obtained by preparing a photographed image, shown in FIG. 11A obtained by photographing the cage with two mice released from above and a background image, shown in FIG. 11B, without a mouse in the same photographing range, calculating a difference therebetween, and performing binarization processing. The white portion of the binary image, shown in FIG. 11C, represents the positions of the mice. The positional information may be extracted from such a binary image.

Figure 12:
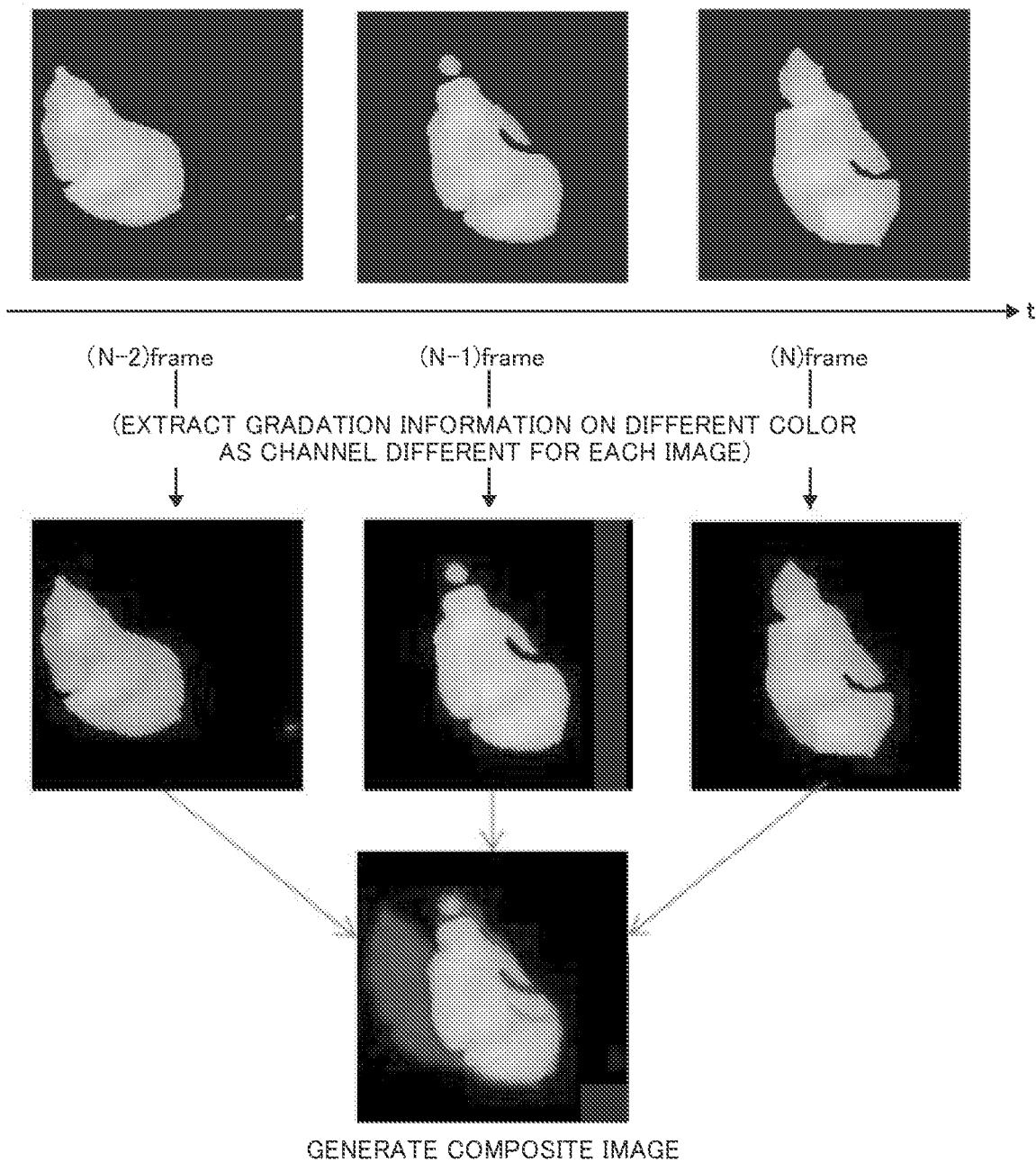
FIG. 12 is an explanatory diagram representing a state of composite image generation regarding one mouse.

FIG. 12 is an explanatory diagram representing a state of composite image generation regarding one mouse. The positions of two mice are extracted by a method as shown in FIGS. 11A-C, and only a region including each mouse is extracted as an image. When a region including two mice is extracted from each of the three frames, three images as shown in FIG. 12 are acquired for each mouse. For example, RGB channels are assigned to these three images, and only the gradation information on the assigned color is extracted from each image. Each of the three images is an image of only the gradation information on R, an image of only the gradation information on G, and an image of only the gradation information on B, and a composite image is obtained by combining these images. Such a composite image is generated for each mouse.

Figure 13:
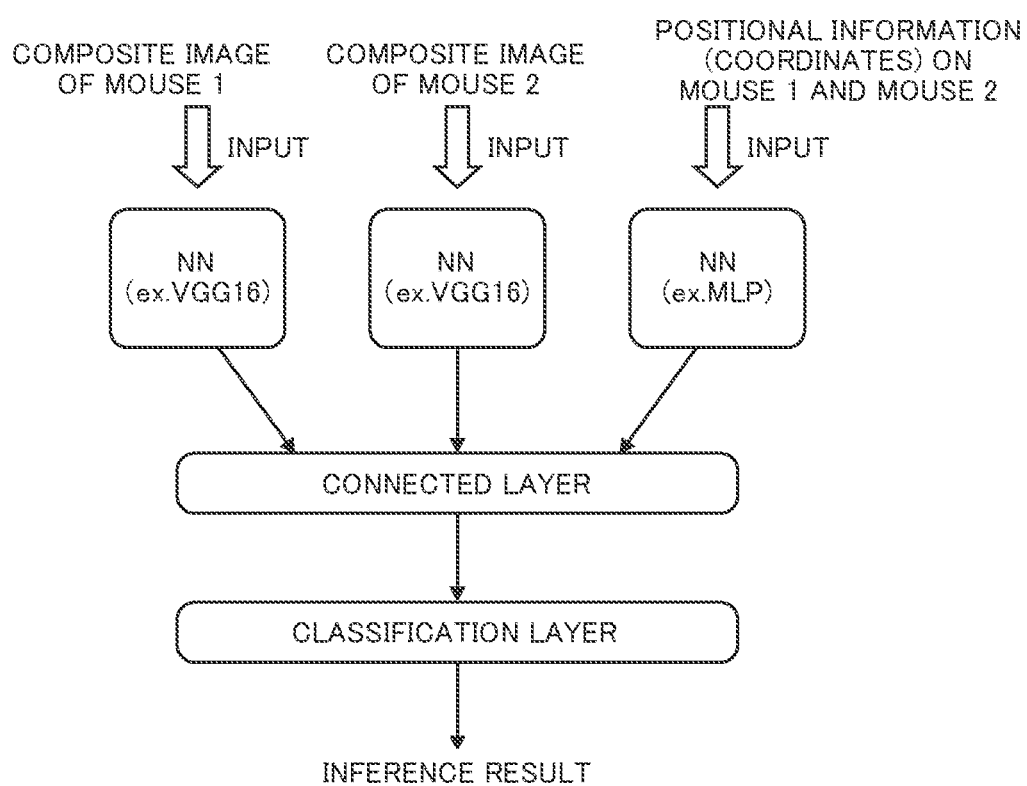
FIG. 13 is a block diagram representing an example of a configuration of the entire model for implementing multi-modal learning.

FIG. 13 is a block diagram representing an example of a configuration of the entire model for implementing multimodal learning. As input data, a composite image for the mouse 1, a composite image for the mouse 2, and positional information on the mice 1 and 2 are prepared, and a neural network portion for inputting each of these is provided. To the neural network of the portion to which the composite image is input, for example, a pre-learned neural network such as the VGG16 may be applied. Then, a connected layer and a classification layer are provided at a subsequent stage of the three neural network portions corresponding to the respective inputs, and an inference result is obtained. For example, it is conceivable that the inference is configured to classify and output which of the four behaviors shown in FIG. 10 the social behavior corresponds to, as an example of social behavior.

As described above, as one aspect of the second embodiment, a positional information acquisition unit for acquiring positional information on the object at a time of acquiring a plurality of images in the image acquisition unit is further included. When a plurality of objects is to be analyzed, the image acquisition unit includes acquiring the plurality of images for each of the plurality of objects, the positional information acquisition unit includes acquiring the positional information on each of the plurality of objects, the channel assignment unit includes assigning a channel to each of a plurality of acquired images for each object, the composite image generation unit includes generating the composite image for each of the objects, and the inference unit includes executing inference related to motion patterns of the plurality of objects with a plurality of the composite images generated for each of the objects and the positional information on each of a plurality of objects as inputs. Therefore, it is possible to accurately estimate a motion or an attribute of an object based on a plurality of images having temporal continuity related to a plurality of objects.

Third Embodiment

Hereinafter, an example of an image analysis apparatus according to a third embodiment of the present invention will be described with reference to the drawings. In the third embodiment, an image analysis apparatus is applied to three-dimensional data from which a plurality of images having spatial continuity can be extracted.

Figure 14:
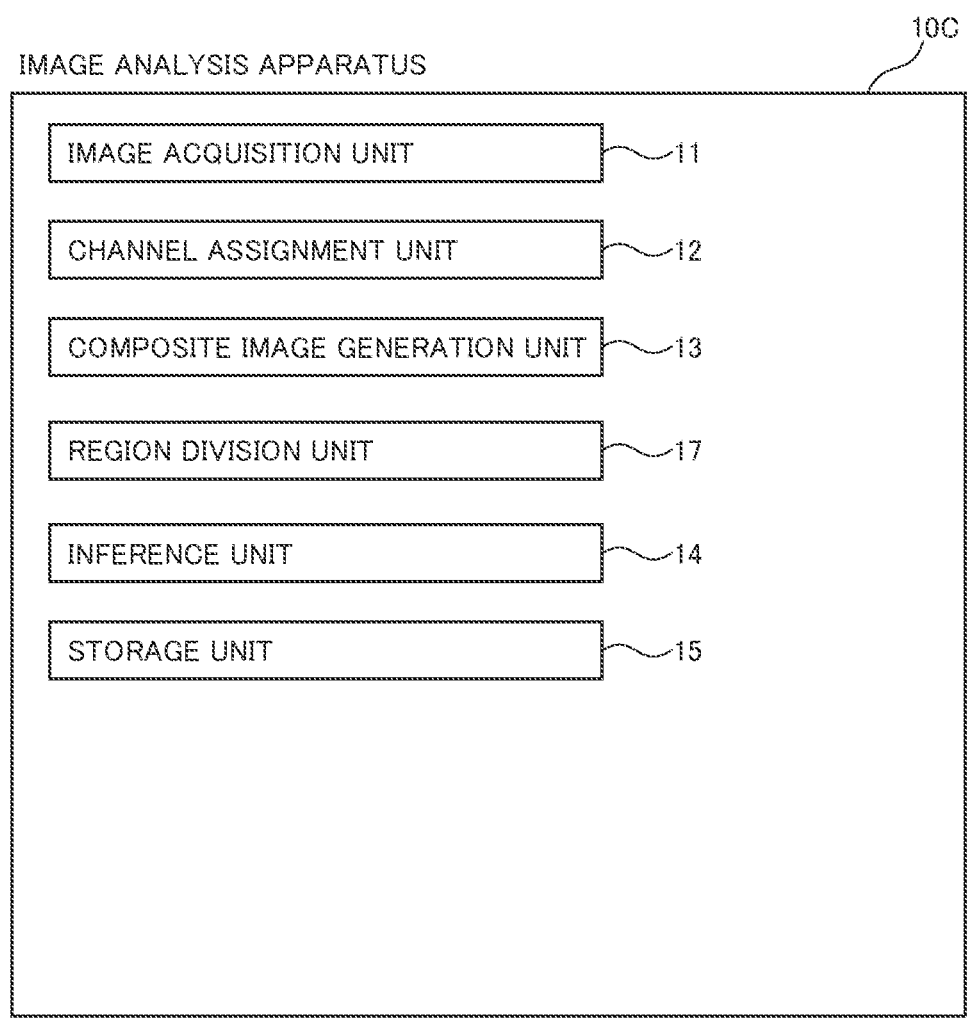
FIG. 14 is a block diagram showing an example of a configuration of an image analysis apparatus corresponding to at least one of embodiments of the present invention.

FIG. 14 is a block diagram showing an example of a configuration of an image analysis apparatus corresponding to at least one of embodiments of the present invention. As shown in FIG. 14, an image analysis apparatus 10C being an example of the image analysis apparatus 10 includes: an image acquisition unit 11, a channel assignment unit 12, a composite image generation unit 13, a region division unit 17, an inference unit 14, and a storage unit 15. Configurations denoted by the same reference numerals as those in the first embodiment have the same functions as those described in the first embodiment, and detailed description of the same functions will be omitted.

The region division unit 17 has a function of dividing the composite image into a plurality of regions of a preset size. The size of the region is preferably determined according to a feature desired to be identified by image analysis. Each of the regions divided here is a target of inference in the inference unit 14.

Figure 15:
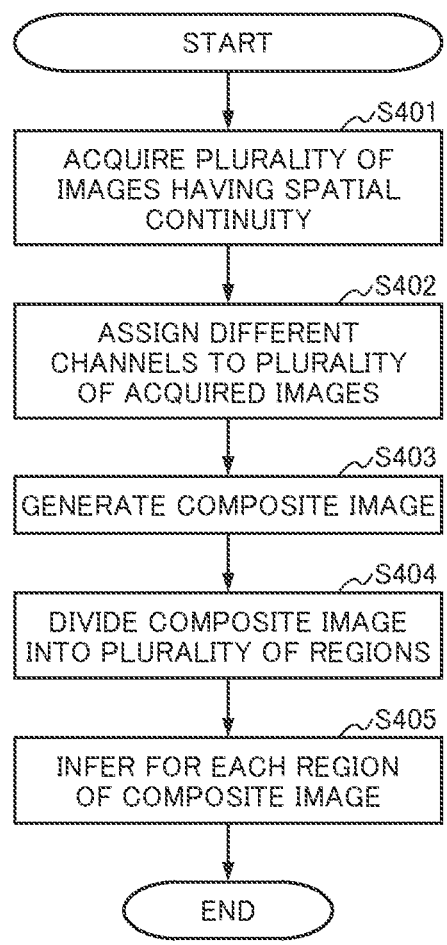
FIG. 15 is a flowchart showing an example of a flow of image analysis processing corresponding to at least one of the embodiments of the present invention.

Next, a flow of image analysis processing corresponding to at least one of the embodiments of the present invention will be described. FIG. 15 is a flowchart showing an example of a flow of image analysis processing corresponding to at least one of the embodiments of the present invention. In FIG. 15, the image analysis processing is started by acquiring a plurality of images having spatial continuity in the image analysis apparatus 10C (step S401). Next, the image analysis apparatus 10C assigns different channels to the plurality of acquired images (step S402). Next, the image analysis apparatus 10C extracts gradation information to which a channel is assigned in each of the plurality of images, combines the pieces of gradation information into one to generate a composite image (step S403). Next, the image analysis apparatus 10C divides the composite image into a plurality of regions (step S404). Then, the image analysis apparatus 10C executes inference for each region of the composite image to acquire an inference result related to image analysis for each region (step S405). The region is switched and the inference is sequentially executed, and the image analysis processing is ended at the time when the inference result is acquired for all the regions of the composite image.

Here, a specific example of image analysis performed by applying the image analysis apparatus 10C according to the third embodiment of the present invention will be described. The image analysis apparatus 10C according to the third embodiment of the present invention has an application target of analysis processing on a plurality of images having spatial continuity, that is, tomographic images and the like continuously acquired in parallel from three-dimensional data. Specifically, the image analysis apparatus 10C can be applied to analyzing voxel data representing a predetermined three-dimensional region obtained by an optical coherence tomography apparatus (OCT) or the like.

Figure 16:
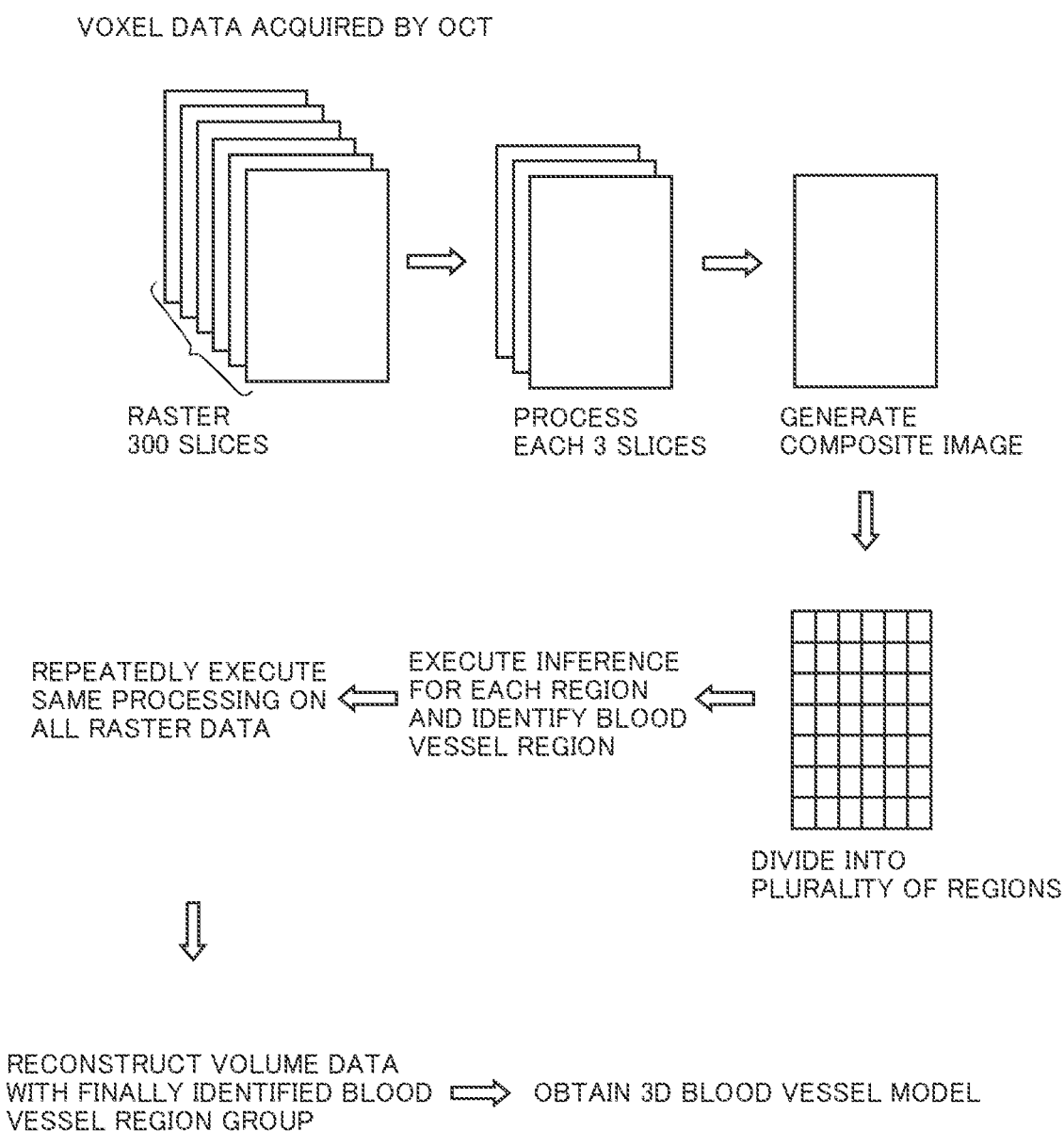
FIG. 16 is an explanatory diagram representing a flow when image analysis processing of identifying a blood vessel region from voxel data obtained when the fundus oculi is photographed by the OCT (optical coherence tomography apparatus) is executed by the image analysis apparatus 10C.

FIG. 16 is an explanatory diagram representing a flow when image analysis processing of identifying a blood vessel region from voxel data obtained when the fundus oculi is photographed by the OCT (optical coherence tomography apparatus) is executed by the image analysis apparatus 10C. First, as shown in FIG. 16, voxel data is converted into, for example, 300 slice raster data, 3 slices each are extracted from the 300 slice raster data, and a composite image is generated based on the 3 slice images. Next, the composite image is divided into a plurality of regions. The size of the region at this time is preferably a size suitable for appropriately identifying the blood vessel region. Then, inference is executed for each region to obtain an inference result as to whether or not all the regions correspond to the blood vessel regions, thereby identifying the blood vessel region in the composite image. The same processing is repeatedly executed also on other combinations of raster data. Then, the 3D blood vessel model corresponding to the voxel data can be obtained by reconstructing the volume data in the blood vessel region group finally identified at the stage where the inference processing on all the composite images is completed.

It should be noted that although it is also possible to identify the blood vessel region for each raster data, it is easier to grasp the extending direction of the blood vessel in the space and the like when the image analysis is performed after generating the composite image in a plurality of slices, for example, three slices, than when the image analysis is performed for each one slice. Therefore, it is possible to obtain an effect that the accuracy of identifying the blood vessel region is improved when the image analysis is performed after the composite image is formed.

As described above, as one aspect of the third embodiment, the plurality of images are a plurality of tomographic images having continuity in a specific direction when a three-dimensional region is represented by stacking a plurality of acquired tomographic images in the specific direction, or a plurality of tomographic images extracted from a three-dimensional model so as to have continuity in a specific direction when a three-dimensional region is represented by a three-dimensional model from which a tomographic image can be optionally extracted. The inference unit includes executing inference related to the three-dimensional region from the composite image. Therefore, it is possible to accurately estimate characteristics, attributes, and the like of the three-dimensional region based on a plurality of images having spatial continuity.

Fourth Embodiment

In the first to third embodiments, one channel is assigned to one image acquired by the image acquisition unit 11, but the present invention is not limited thereto. In the fourth embodiment, an example in which one channel is assigned to a composite of two images will be described. FIG. 17 is an explanatory diagram representing another method of composite image generation in the image analysis apparatus corresponding to at least one of the embodiments of the present invention. As shown in FIG. 17, two images before channel assignment may be combined by, for example, light and dark comparison or the like, and a channel may be assigned to the image after composition. For example, composition using light and darkness means that when gradation information on each color is represented by 256 levels, one image of the two images is converted so that the level of the color falls within the range of 0 to 127, the other image is converted so that the level of the color falls within the range of 128 to 255, and these two images are combined, whereby two images can be assigned to one channel corresponding to one specific color. By using this method, the amount of information included in the composite image can be increased. By adopting this method, for example, in the case of using three channels of RGB, it is possible to combine two images by light and darkness and then assign the combined image to each of the three channels of RGB, and cause a composite image to include information on six images.

Fifth Embodiment

In the first to third embodiments, a case where three colors of RGB are used as channels has been described as an example of channel assignment for generating a composite image. However, in the fifth embodiment, a method of extracting luminance information will be described as one example of various types of gradation information that can be set as channels.
(1) Method for Generating Luminance (Brightness) Image from Color Image
[Precondition]
When the video is captured by a black-and-white camera, only a single channel is included when the video is stored in grayscale, and thus the image is set as the luminance image. On the other hand, since a gray image may be often stored as a color image, any channel may be used in that case.
[Use of Single Channel]
An image of a color channel of any one of RGB is used. At that time, it is preferable to select an optimum channel according to the color of the object. Alternatively, in the color image, the image of the G channel reflecting the luminance information most may be used.
[Processing of Multiple Channels]
The respective images of the RGB channels are mixed at any ratio to generate a luminance image (making a difference in that the luminance image is obtained by processing, not by simple extraction). A luminance image obtained by simply adding them and dividing the sum by 3 may be used, or mixing may be performed at a ratio considering the wavelength sensitivity characteristic of human eyes. For example, as a method of converting a color image of the NTSC standard color system into grayscale, a method of calculating luminance Y of each pixel by a formula $Y=0.299R+0.587G+0.114B$ is known.
[Processing of Extracted Luminance Image]
It is also effective to apply processing for making the luminance relationship between the background of the image and the object of interest clearer to the extracted image. For example, when a white object (corresponding to the white mouse of the example) is photographed with a dark background, or a black object (a black mouse is also often used in experiments) is photographed with a bright background, it is also effective to invert the luminance as necessary. In addition, when the background of the extracted image is gray and the object of interest appearing therein is gray slightly lighter than that of the background, it is very effective for improving the prediction accuracy to perform luminance correction so that the background becomes black and the object of interest becomes white.

(2) Method of Extracting or Processing Information Other than Luminance from Color Image and Using the Information as Luminance Image

[Preliminary Information]

An image obtained by colors (RGB color space) of 3 channels of RGB can be mutually converted with a color space (HSV color space or substantially equivalent HLS color space) including hue, saturation, and value (or luminance).

[Using Hue as Luminance Image]

Since the hue in the HSV color space does not include the luminance of the image, even if there is a shadow, the color of the object can be extracted as information. This means that robustness against uneven lighting and reflection of shadows is high. In addition, by extracting the hue in a predetermined range, it is possible to extract an object of interest, and a scene with higher usefulness than a simple luminance image can be envisaged. Specifically, it is possible to easily extract a skin portion (palm or face) of the human body by extracting a hue near red. When this is extended, in a case where a plurality of objects of interest having different hues exist in an image, since a difference in hue can be used as a luminance image (A general hue is represented by an annular structure referred to as hue circle that starts from red, proceeds to yellow, green, light blue, blue, and purple, and returns to red. The hue can be quantified by giving a numerical value that increases by 60 for each of the above colors with red as 0), it is also possible to identify and extract the object. Hue can also improve the prediction accuracy by shifting the color or performing correction as necessary.

[Using Those Other than Hue as Luminance Image]

The saturation and the value can be used similarly to the hue. Since the saturation indicates the vividness of color, it can be used when focusing on a vivid region regardless of the type of color. However, unlike the hue, since the saturation is easily affected by lighting or shadow reflection, its use is limited to when such influence is low and focusing on vividness is optimal. On the other hand, since the value generally uses the luminance of the channel having the maximum value in each pixel [V=max(R, G, B)], although slightly different, a result similar to the apparently natural grayscale image as described in the processing of the plurality of channels is obtained. Luminance correction is possible also for these.

Sixth Embodiment

In the first to third embodiments, as an example of assignment of channels for generating a composite image, a case where three colors of RGB are used as channels has been described, but the present invention is not limited thereto, and gradation information on four or more colors may be adopted as the channels.

As a specific example of the channel setting related to the gradation information, for example, in a case of four colors or less, it is possible to cope with the case by adopting the RGB(A) method or the CMYK method. In addition, in the fifth embodiment, six colors (red, yellow, green, light blue, blue, purple) have been exemplified in the description of the hue, but the channel setting may be set to these six colors. Although a still larger number of colors can be selectively used, it is preferable to adopt a clear and easily distinguishable color such as the above six colors as the color assigned to each channel.

Here, the currently most widespread method as a video/image recording method is processing using an RGB color space, and in channel settings including color representation other than RGB, such as a CMYK method and a six-color (red, yellow, green, light blue, blue, purple) system, there arises a problem that colors of overlapping portions at the time of composition cannot be correctly represented.

FIGS. 18A and B are explanatory diagrams representing a relationship between each color and an RGB value when a 6-color system is adopted as a channel related to gradation information. Among them, FIG. 18A is an explanatory diagram representing a relationship (no limitation) between each color and an RGB value when a six-color system of red, yellow, green, light blue, blue, and purple is adopted. FIG. 18A represents the upper limit value of each value of RGB when six colors of red, yellow, green, light blue, blue, and purple are indicated with 8-bit resolution (represented by a luminance level of 0 to 255) of each channel of RGB which is currently most widely used. For example, focusing on yellow, the values of R and G are 255, and B is 0. This is the same value as the overlapping portion of red and green, and thus it is not possible to distinguish whether the yellow region in the image is the overlapping portion of red and green or the single yellow portion as a result of the composition. In addition, as a result of overlapping of a plurality of images, when the RGB value exceeds 255, the color is saturated and the value equal to or larger than 255 is rounded to 255 without being reflected, and thus, there arises a case where correct overlapping of layers cannot be indicated.

FIG. 18B is an explanatory diagram representing a relationship between each color of six colors and an RGB value when an upper limit is set in order to prevent an image from being collapsed at the time of composition. As shown in FIG. 18A in the case of no limitation, even if the channels of all colors are combined, it can be seen that the values of the RGB channels remain in multilayers of a maximum of 3 times for any element (255×3). For this reason, if each value of RGB used for the layer is set to 85 (=255÷3), the luminance value of each channel of the pixel can be limited to the maximum of 255 even when all the layers overlap each other. Accordingly, it is possible to retain the colors of all overlapping combinations of layers.

Seventh Embodiment

In the first to third embodiments, it has been described that different channels are set for a plurality of images, gradation information corresponding to a corresponding one of channels is extracted in each image, and the extracted pieces of gradation information are combined to generate one composite image, and when the composite image is generated, a plurality of pieces of gradation information is combined in each pixel to determine gradation information and luminance information on each pixel, but the present invention is not limited thereto. For example, a pixel value of a new image or an old image on a time-series basis may be adopted as a value of gradation information and luminance information of each pixel. Similarly, a pixel value of the image on the deep side or the image on the near side when spatially continuous may be adopted as the value of the gradation information and the luminance information of each pixel. That is, rather than combining, processing of overwriting and superimposing may be adopted to obtain a composite image.

Figure 19:
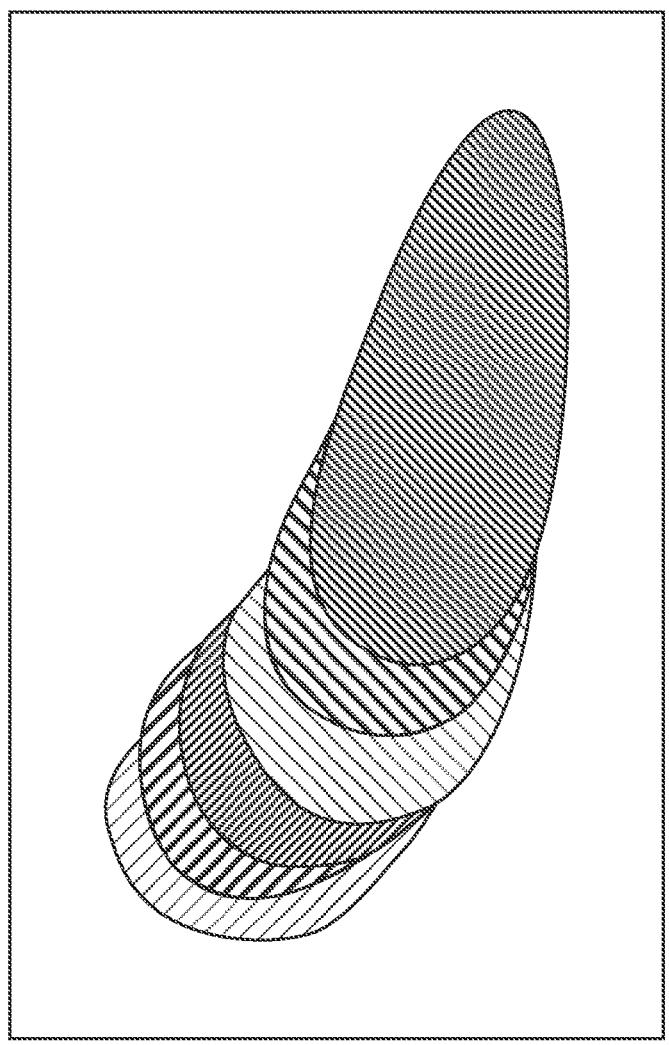
FIG. 19 is an explanatory diagram representing an example of a composite image generated by overwriting and superimposing processing.

FIG. 19 is an explanatory diagram representing an example of a composite image generated by overwriting and superimposing processing. In FIG. 19, gradation information of six colors is adopted as channels, and channels of different colors are assigned to six images having temporal continuity. Then, when the six images are combined, the images are combined so that a temporally new image is superimposed on another, such as overwriting the temporally oldest image with the second oldest image. At this time, it is necessary to determine an effective region in each image. For example, when it is desired to analyze the movement of the mouse, the contour of the mouse may be extracted and the inside of the contour may be determined as an effective region. Information on pixels in the effective region is overwritten on an old image. As the information outside the effective region, information on the oldest image may be adopted, or the composition processing similar to that of the first to third embodiments may be executed. In this way, when the superimposition is executed while sequentially overwriting temporally old images, as shown in FIG. 19, when the object moves, there is an effect that the locus of the movement is more easily grasped.

It should be noted that in the example in FIG. 19, the superimposition processing is executed by overwriting all the pixels in the effective region, but a contour line obtained by extracting only a contour of the effective region of each image with a predetermined pixel thickness may be superimposed similarly to FIG. 19. Also by this method, similarly to FIG. 19, it is possible to obtain an effect of still more easily grasping the locus of the movement of the object.

Eighth Embodiment

In the first to third embodiments, the description has been given on the premise that there is a case where inference processing is executed by a learned model that has been learned in advance in inference in the inference unit 14. Although the entity for generating the learned model in that case has not been specified, it is needless to say that the image analysis apparatus 10 may include a learning unit.

Figure 20:
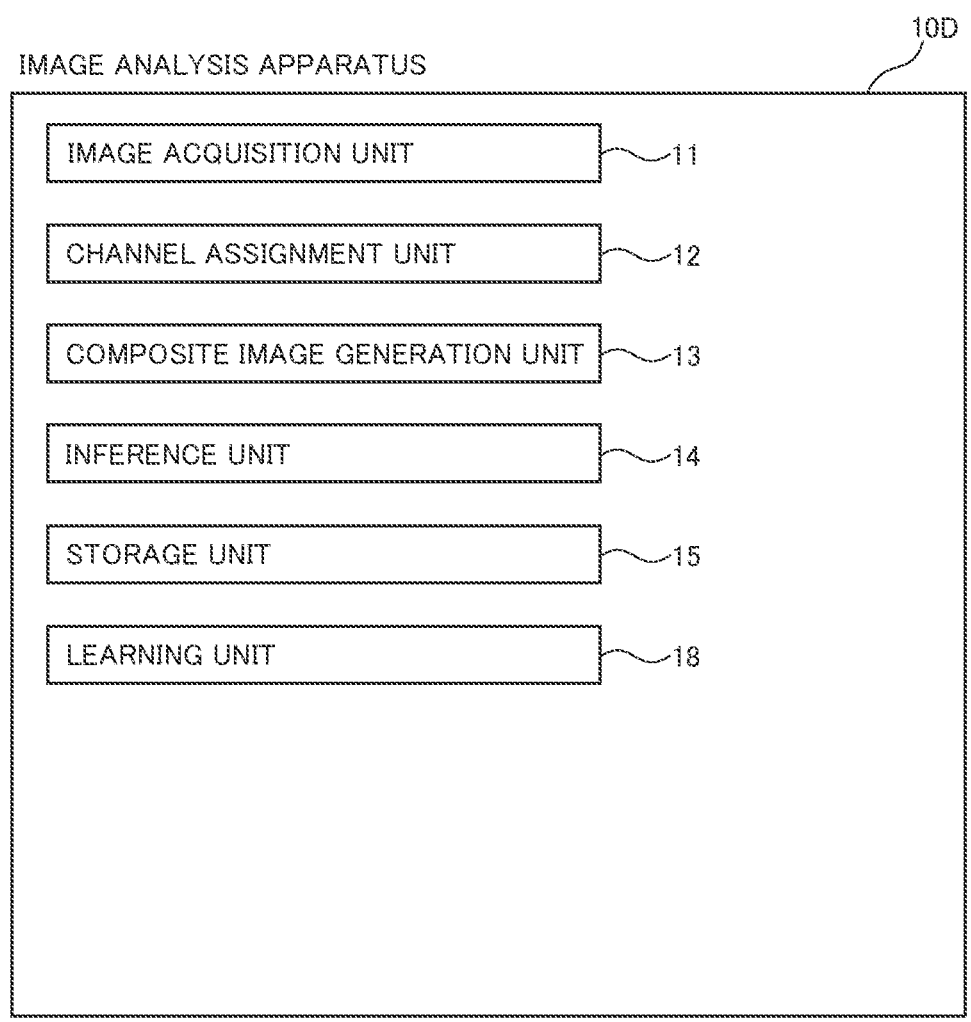
FIG. 20 is a block diagram showing an example of a configuration of an image analysis apparatus corresponding to at least one of embodiments of the present invention.

FIG. 20 is a block diagram showing an example of a configuration of an image analysis apparatus corresponding to at least one of embodiments of the present invention. FIG. 20 represents an image analysis apparatus 10D in which the image analysis apparatus 10A described according to the first embodiment is caused to be further provided with a learning unit 18. The learning unit 18 has a function of executing learning processing with the composite image and the correct answer data on the analysis result of the composite image as a set and executing update of the parameters of the neural network. That is, by including the learning unit 18, the learning processing of the learned model adopted in the image analysis apparatus 10D can be executed in the own apparatus, and additional learning processing can be further executed on the obtained learned model. It should be noted that the learning processing is executed by a flow similar to that in FIG. 5.

Although various embodiments of the present invention have been described by the first to eighth embodiments, the present invention is not limited thereto, and can be applied to various uses. For example, embodiments such as individual identification and abnormal behavior detection of a person from a monitoring camera, abnormal travel detection of a vehicle from a road monitoring camera, behavior classification from a sport relay moving image, and abnormal portion detection from organ 3D data are also naturally conceivable.

REFERENCE SIGNS LIST

10 image analysis apparatus
11 image acquisition unit
12 extraction unit
13 prediction unit
14 inference unit
15 storage unit
16 positional information acquisition unit
17 region division unit

The invention claimed is:

1. An image analysis method comprising:
    (a) acquiring a plurality of images having temporal or spatial continuity;
    (b) assigning a channel different from each other to gradation information corresponding to a color having a hue different from each other, for each image of the plurality of images;
    (c) generating one color composite image in which gradation information on at least a part of each image can be identified by combining pieces of gradation information corresponding to colors having different hues by extracting the gradation information to which the channel is assigned from each of the plurality of images and combining the extracted gradation information; and
    (d) analyzing the color composite image and inferring the plurality of images.

2. The image analysis method according to claim 1, wherein (d) analyzing the color composite image and inferring the plurality of images includes:
    inputting the generated color composite image to a learned model on which machine learning is performed in advance based on a plurality of color composite images generated from a plurality of sample images used for learning, and
    obtaining an output of the learned model as an inference result.

3. The image analysis method according to claim 1,
    wherein the plurality of images are a plurality of images extracted at regular time intervals from a moving image including a plurality of images having temporal continuity obtained by shooting a moving image of a predetermined moving object, and
    wherein (d) analyzing the color composite image and inferring the plurality of images includes executing an inference related to a motion pattern of the predetermined moving object from the color composite image generated based on the moving image.

4. The image analysis method according to claim 3, further comprising
    (e) acquiring positional information on the predetermined moving object at a time of acquiring the plurality of images, and
    wherein when a plurality of objects is to be analyzed,
    (a) acquiring a plurality of images having temporal or spatial continuity includes acquiring the plurality of images for each of the plurality of objects,
    (e) acquiring positional information on the object at a time of acquiring a plurality of images includes acquiring the positional information on each of the plurality of objects,
    (b) assigning a channel different from each other to gradation information on a color having a hue different from each other includes assigning a channel to each of a plurality of acquired images for each object,
    (c) generating one color composite image in which gradation information on at least a part of each image can be identified includes generating the color composite image for each of the objects, and (d) analyzing the color composite image and inferring the plurality of images includes executing an inference related to motion patterns of the plurality of objects with a plurality of the composite images generated for each of the objects and the positional information on each of the plurality of objects as inputs.

5. The image analysis method according to claim 1, wherein the plurality of images are a plurality of tomographic images having continuity in a specific direction when a three-dimensional region is represented by stacking a plurality of acquired tomographic images in the specific direction, or a plurality of tomographic images extracted from a three-dimensional model so as to have continuity in a specific direction when a three-dimensional region is represented by a three-dimensional model from which a tomographic image can be optionally extracted, and wherein (d) analyzing the color composite image and inferring the plurality of images includes executing an inference related to the three-dimensional region from the color composite image.

6. An image generation method comprising:
(a) acquiring a plurality of images having temporal or spatial continuity;
(b) assigning a channel different from each other to gradation information corresponding to a color having a hue different from each other, for each image of the plurality of images; and
(c) generating one color composite image in which gradation information on at least a part of each image can be identified by combining pieces of gradation information corresponding to colors having different hues by extracting the gradation information to which the channel is assigned from each image of the plurality of images and combining the extracted gradation information.

7. The image generation method according to claim 6, further comprising:
(d) acquiring correct answer data when the inference on the color composite image is executed;
(e) inputting the color composite image to a model including a neural network, causing the inference to be executed, and causing an inference result to be output; and
(f) updating a parameter of the model using the inference result and the correct answer data.

8. An image analysis apparatus comprising a hardware processor that:
acquires a plurality of images having temporal or spatial continuity;
assigns a channel different from each other to gradation information corresponding to a color having a hue different from each other, for from each image of the plurality of images;
generates one color composite image in which gradation information on at least a part of each image can be identified by combining pieces of gradation information corresponding to colors having different hues by extracting the gradation information to which the channel is assigned from each of the plurality of images and combining the extracted gradation information; and
analyzes the color composite image and infers the plurality of images.

9. A non-transitory recording medium storing a computer readable program, the program causing a computer to implement:
(a) acquiring a plurality of images having temporal or spatial continuity;
(b) assigning a channel different from each other to gradation information corresponding to a color having a hue different from each other, for each image of the plurality of images;
(c) generating one color composite image in which gradation information on at least a part of each image can be identified by combining pieces of gradation information corresponding to colors having different hues by extracting the gradation information to which the channel is assigned from each of the plurality of images and combining the extracted gradation information; and
(d) analyzing the color composite image and inferring the plurality of images.

\* \* \* \* \*